US012470030B2

(12) United States Patent
Yanagimoto et al.

(10) Patent No.: US 12,470,030 B2
(45) Date of Patent: Nov. 11, 2025

(54) ROTARY CONNECTOR

(71) Applicant: SoftBank Corp., Tokyo (JP)

(72) Inventors: Noritomo Yanagimoto, Tokyo (JP); Hideyuki Yagihashi, Kanagawa (JP); Tomoya Watanabe, Tokyo (JP)

(73) Assignee: SoftBank Corp., Tokyo (JP)

( * ) Notice: Subject to any disclaimer, the term of this patent is extended or adjusted under 35 U.S.C. 154(b) by 0 days.

(21) Appl. No.: 19/086,175

(22) Filed: Mar. 21, 2025

(65) Prior Publication Data

US 2025/0219341 A1 Jul. 3, 2025

Related U.S. Application Data

(63) Continuation of application No. PCT/JP2023/046598, filed on Dec. 26, 2023.

(30) Foreign Application Priority Data

Dec. 26, 2022 (JP) ................................ 2022-208313

(51) Int. Cl.
*H01R 39/08* (2006.01)
*H01R 39/12* (2006.01)
*H01R 39/64* (2006.01)

(52) U.S. Cl.
CPC ............ *H01R 39/08* (2013.01); *H01R 39/64* (2013.01); *H01R 39/12* (2013.01)

(58) Field of Classification Search
CPC ........ H01R 39/08; H01R 39/64; H01R 39/12; H01R 39/14; H01R 39/18; H01R 39/027;
(Continued)

(56) References Cited

U.S. PATENT DOCUMENTS

| | | | | |
|---|---|---|---|---|
| 7,559,767 B2 * | 7/2009 | Coleman | ................ | H01R 39/08 439/23 |
| 7,701,108 B2 * | 4/2010 | Yu | .......................... | H01R 39/08 439/23 |
| 8,376,757 B2 * | 2/2013 | Yamamoto | ............ | H01R 39/64 439/25 |

FOREIGN PATENT DOCUMENTS

| | | | |
|---|---|---|---|
| CN | 202340044 U | 7/2012 | |
| CN | 113629466 A * | 11/2021 | ............... H01R 3/08 |

(Continued)

OTHER PUBLICATIONS

Machine Translation of KR 101285280.*
(Continued)

*Primary Examiner* — Renee S Luebke
*Assistant Examiner* — Paul D Baillargeon

(57) ABSTRACT

There is provided a rotary connector including: a case; and a rotor, in which the rotor has a plurality of conductive ring portions, each of which includes a core wire ring, a first GND ring, a second GND ring, a first core wire barrier, and a second core wire barrier, and a plurality of channel barriers arranged respectively between the plurality of conductive ring portions, the case has a plurality of connector portions, each of which includes a connector, a core wire brush having one end side connected to the connector and another end side in contact with the core wire ring, a first GND brush having one end side connected to the connector and another end side in contact with the first GND ring, and a second GND brush having one end side connected to the connector and another end side in contact with the second GND ring.

4 Claims, 12 Drawing Sheets

(58) Field of Classification Search
CPC .. H01R 2105/00; H01R 2107/00; H01P 1/066
USPC .......................................................... 333/261
See application file for complete search history.

(56) References Cited

FOREIGN PATENT DOCUMENTS

| | | | | |
|---|---|---|---|---|
| JP | 2001210430 | A | | 8/2001 |
| JP | 2007265847 | A | | 10/2007 |
| JP | 2008130319 | A | | 6/2008 |
| JP | 2008243766 | A | | 10/2008 |
| JP | 2013143183 | A | | 7/2013 |
| JP | 2016066512 | A | | 4/2016 |
| KR | 101285280 | B1 | * | 7/2013 |

OTHER PUBLICATIONS

International Search Report and Written Opinion (ISA/237) of the International Search Authority for International Patent Application No. PCT/JP2023/046598, mailed by the Japan Patent Office on Feb. 13, 2024.

Decision to Grant a Patent issued for counterpart Japanese Application No. 2022-208313, transmitted from the Japanese Patent Office on Apr. 18, 2023 (drafted on Apr. 14, 2023).

Office Action issued for counterpart Japanese Application No. 2022-208313, transmitted from the Japanese Patent Office on Feb. 28, 2023 (drafted on Feb. 20, 2023).

* cited by examiner

ROTARY CONNECTOR

The contents of the following patent application(s) are incorporated herein by reference:

NO. 2022-208313 filed in JP on Dec. 26, 2022

NO. PCT/JP2023/046598 filed in WO on Dec. 26, 2023.

BACKGROUND

1. Technical Field

The present invention relates to a rotary connector.

2. Related Art

Patent Document 1 describes a rotary connector device using a conductive ring and a conductive brush.

PRIOR ART DOCUMENTS

Patent Documents

Patent Document 1: Japanese Patent Application Publication No. 2013-143183

DESCRIPTION OF EXEMPLARY EMBODIMENTS

When equipment that involves a cable connection, is rotated, a rotary connector (slip ring) is required. For a multi-pole rotary connector, due to its principle, it is difficult to transmit a wave of an alternating current. It becomes more difficult at a higher frequency and with more cables. In order to create a rotary connector which meets these requirements, it is important to control a resistance between internal poles and match characteristic impedance to a target. A rotary connector 100 according to the present embodiment contributes to solving such a problem by, for example, carefully considering a barrier shape. In addition, the rotary connector 100 contributes to solving such a problem by, for example, carefully considering a casing shape.

Hereinafter, the present invention will be described through embodiments of the invention, but the following embodiments do not limit the invention according to the claims. In addition, not all of the combinations of features described in the embodiments are essential to the solution of the invention.

Figure 1:
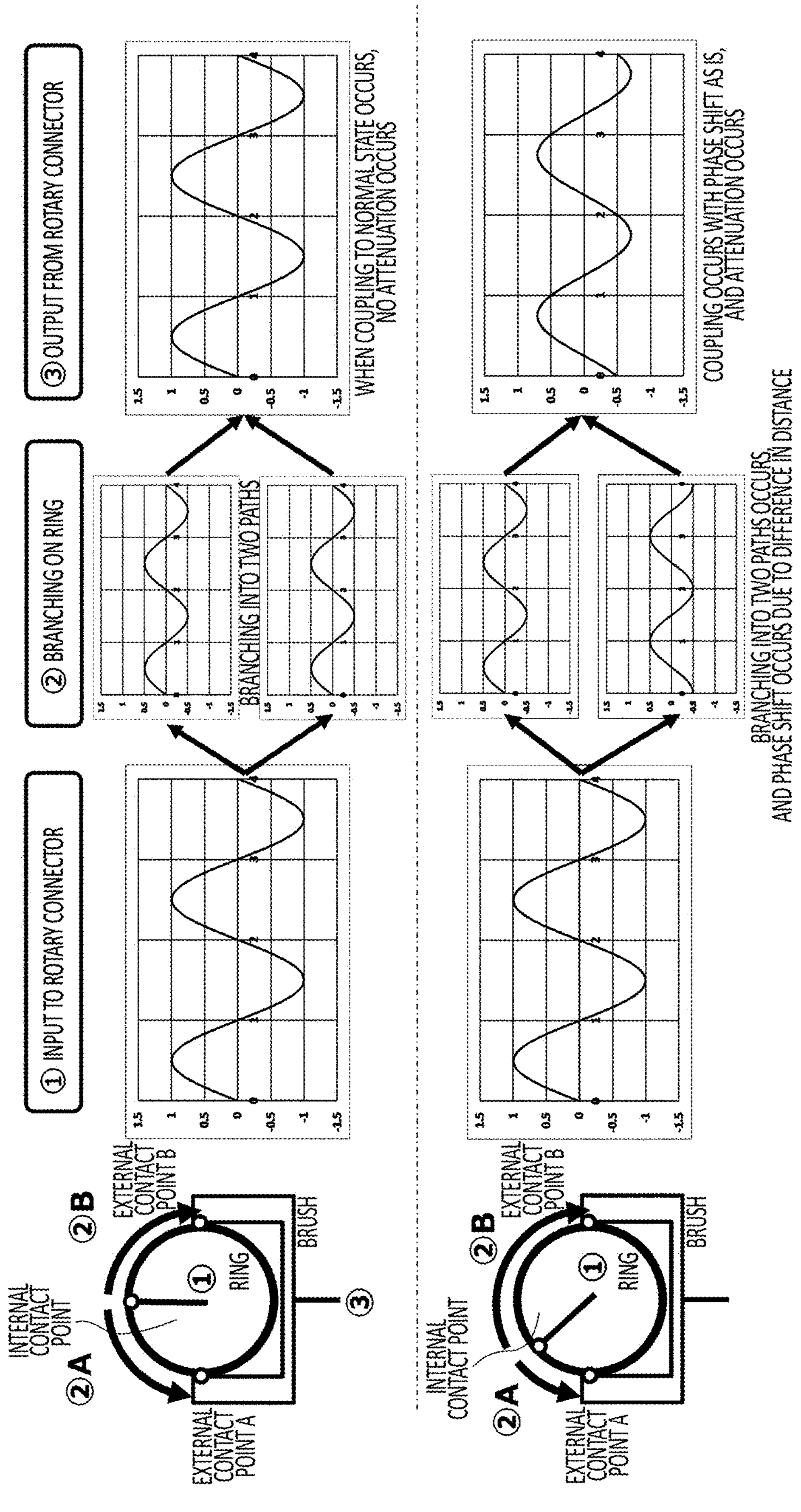
FIG. 1 is an illustration for describing a characteristic of a rotary connector.

FIG. 1 is an illustration for describing a characteristic of a rotary connector. FIG. 1 shows examples of a cross sectional shape of a rotary connector, an input waveform to the rotary connector, and an output waveform from the rotary connector.

As shown in an upper part of FIG. 1, when a distance from an internal contact point to an external contact point A is equal to a distance from the internal contact point to an external contact B, branching occurs on a ring, and then coupling to a normal state occurs, thereby causing no signal attenuation to occur. On the other hand, as shown in a lower part of FIG. 1, when a distance from an internal contact point to an external contact point B is different from a distance from the internal contact point to an external contact B, a phase shift occurs due to a difference in distance, and coupling occurs with the phase shift as is, thereby causing a signal attenuation to occur.

In this way, a path length of the rotary connector varies with a rotation thereof, to adversely affect a high frequency signal. For example, in a case of an RF (Radio Frequency) rotary connector, due to the influence, there is a physical limitation by the frequency. Further, in the RF rotary connector, when the number of channels is increased, a cross section for the cables to pass through is increased, and it becomes unable to handle the high frequency causing a high attenuation. Such a problem is difficult to physically solve, and requires a careful consideration to reduce a reflection and a leakage in another part.

Figure 2:
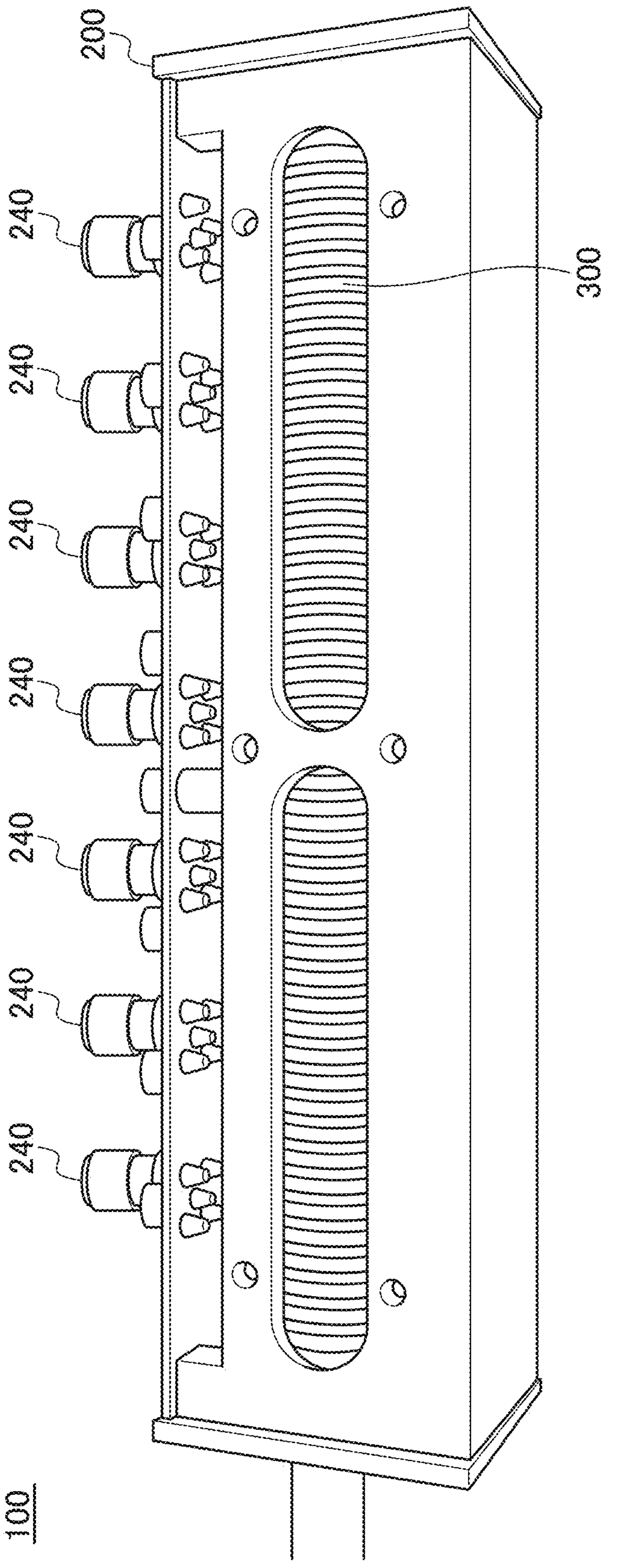
FIG. 2 schematically shows an example of a rotary connector 100.
Figure 3:
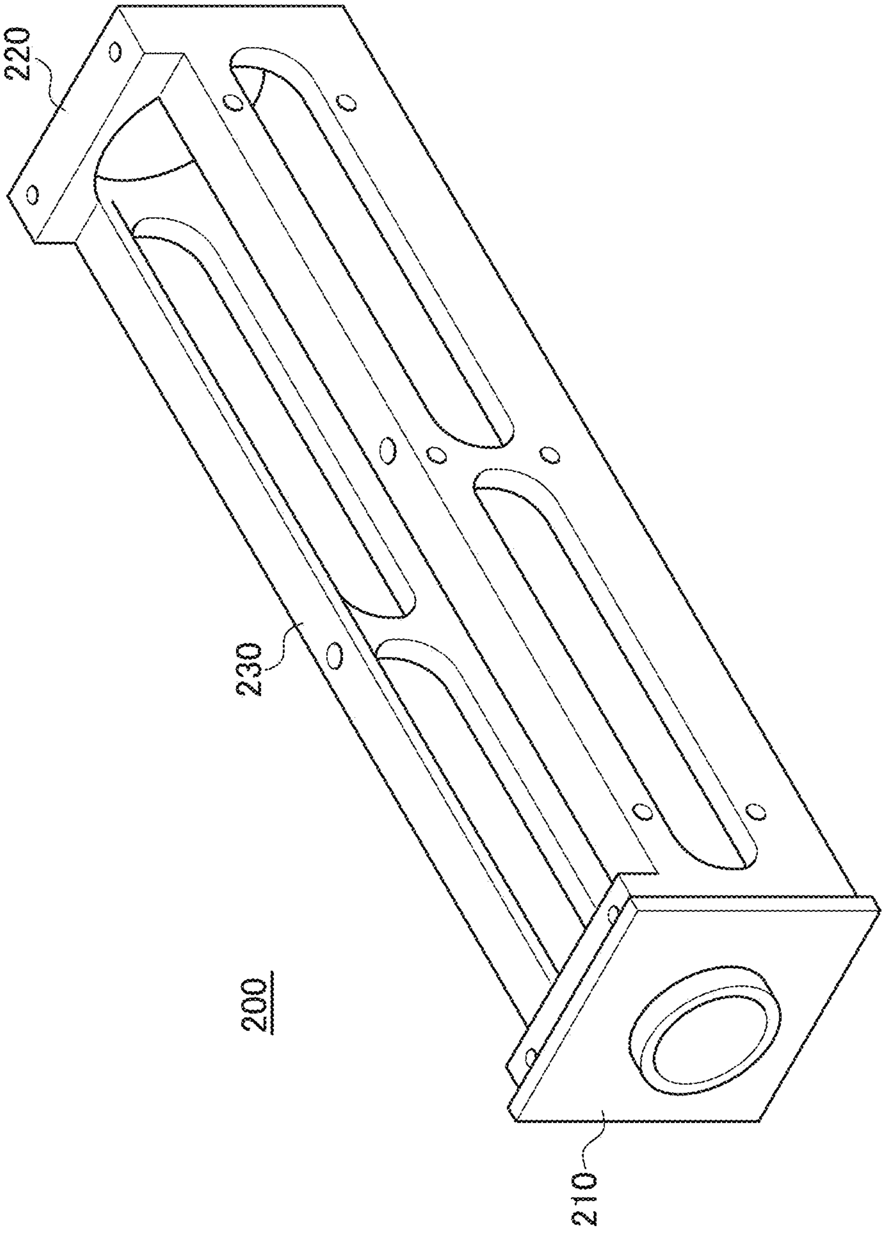
FIG. 3 schematically shows an example of the rotary connector 100.
Figure 4:
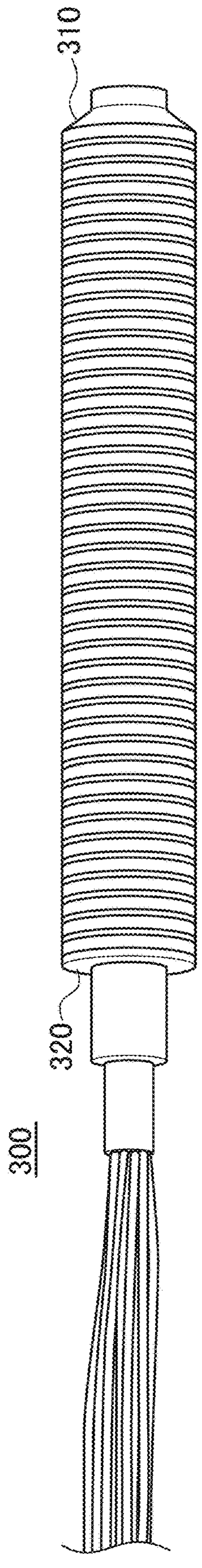
FIG. 4 schematically shows an example of the rotary connector 100.
Figure 5:
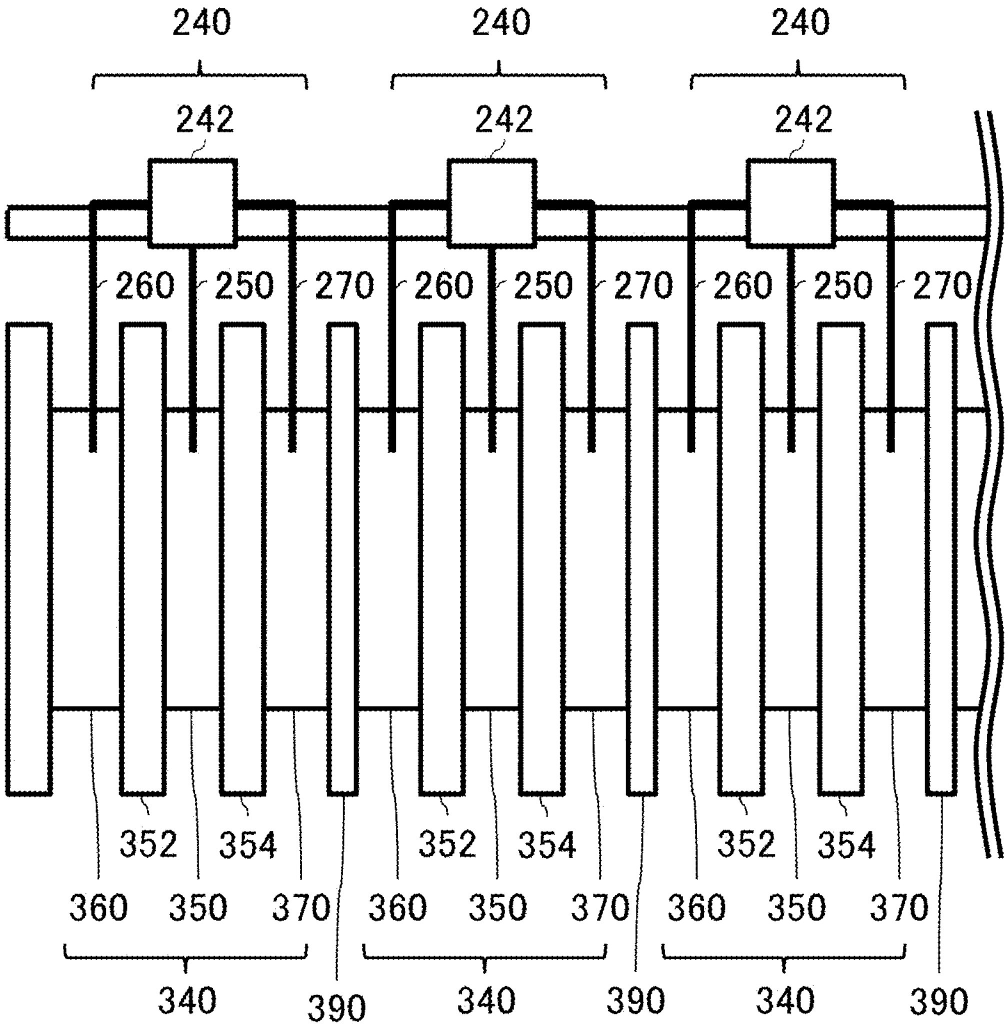
FIG. 5 schematically shows an example of a structure of the rotary connector 100.

FIG. 2, FIG. 3, and FIG. 4 schematically show examples of the rotary connector 100 according to the present embodiment. FIG. 5 schematically shows an example of a structure of the rotary connector 100. The rotary connector 100 includes a case 200; and a rotor 300 of a cylindrical shape which is arranged in the case 200 to be able to be rotated with respect to the case 200.

The rotor 300 has a plurality of conductive ring portions 340 which respectively correspond to a plurality of channels, and a plurality of channel barriers 390 arranged respectively between the plurality of conductive ring portions 340. A conductive ring portion 340 includes a core wire ring 350, a ground (GND) ring 360, a GND ring 370, a core wire barrier 352 arranged between the core wire ring 350 and the GND ring 360, and a core wire barrier 354 arranged between the core wire ring 350 and the GND ring 370. The GND ring 360 may be an example of a first GND ring, the GND ring 370 may be an example of a second GND ring, the core wire barrier 352 may be an example of a first core wire barrier, and the core wire barrier 354 may be an example of a second core wire barrier.

The core wire barrier 352, the core wire barrier 354, and the channel barrier 390 have a disk shape. Lengths of the core wire barrier 352, the core wire barrier 354, and the channel barrier 390, along an axial direction in a cylindrical coordinate system based on the rotor 300, are referred to as thicknesses of the core wire barrier 352, the core wire barrier 354, and the channel barrier 390; and lengths in a radial direction in the cylindrical coordinate system are referred to as diameters of the core wire barrier 352, the core wire barrier 354, and the channel barrier 390.

The case 200 has an upper surface side portion 210 which corresponds to an upper surface 310 of the rotor 300; a lower surface side portion 220 which corresponds to a lower surface 320 of the rotor 300; and a side surface side portion 230 which covers the rotor 300.

The case 200 includes a plurality of connector portions 240 which respectively correspond to the plurality of channels. A connector portion 240 includes a connector 242, a core wire brush 250, a GND brush 260, and a GND brush 270. The connector 242 may be, for example, a so-called SMA (Sub Miniature Type A) connector. The core wire brush 250 has one end side connected to the connector 242 and another end side in contact with the core wire ring 350. The GND brush 260 has one end side connected to the connector 242 and another end side in contact with the GND ring 360. The GND brush 260 may be an example of a first GND brush. The GND brush 270 has one end side connected to the connector 242 and another end side in contact with the GND ring 370. The GND brush 270 may be an example of a second GND brush.

The case 200 is constituted by, for example, aluminum. The case 200 may be constituted by another metal such as stainless steel.

The core wire barrier 352 and the core wire barrier 354 are constituted by an insulator. The characteristic impedance of each channel depends on the degree of the insulation of the core wire barrier 352 and the core wire barrier 354.

The thickness of the core wire barrier 352 may be a thickness based on the characteristic impedance of the corresponding channel. That is, the core wire barrier 352 may have a thickness with a degree of the insulation for being able to realize the characteristic impedance of the channel that is set as a target.

The thickness of the core wire barrier 354 may be a thickness based on the characteristic impedance of the corresponding channel. That is, the core wire barrier 354 may have a thickness with a degree of the insulation for being able to realize the characteristic impedance of the channel that is set as a target.

Figure 6:
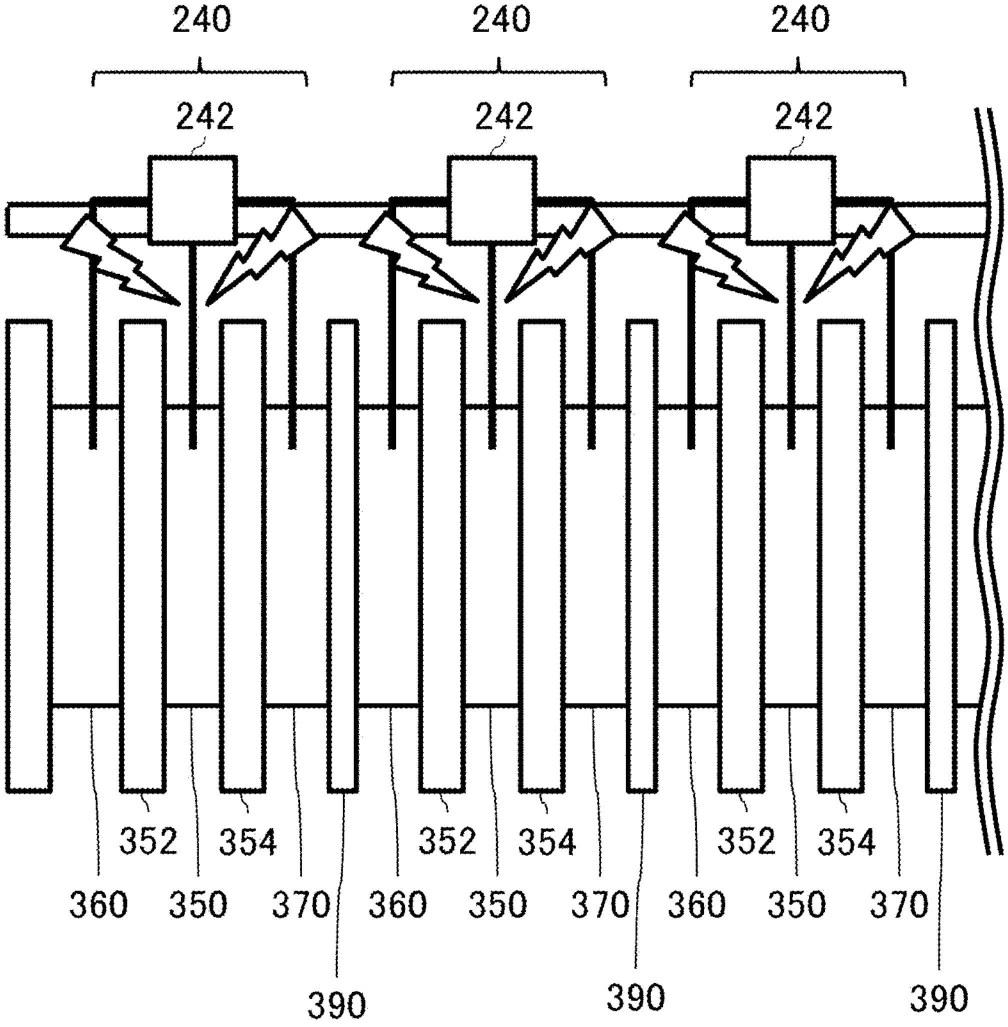
FIG. 6 is an illustration for describing a characteristic of the rotary connector 100.

FIG. 6 is an illustration for describing a characteristic of the rotary connector 100. In relationships in which the core wire brush 250, the GND brush 260, and the GND brush 270 come into contact with the core wire ring 350, the GND ring 360, and the GND ring 370 in a tilted state, between a part of the case 200 where the connector 242 is arranged, and the rotor 300, a certain distance or more is required, so that a gap exists.

By using the rotary connector 100 to conduct an experiment, the inventor has discovered that when a high voltage is applied to the core wire brush 250, the core wire brush 250 functions as an antenna, and a leakage radio wave occurs. The leakage radio wave may adversely affect an adjacent channel, and thus it is desirable to adopt a configuration that reduces the influence of the leakage radio wave.

Figure 7:
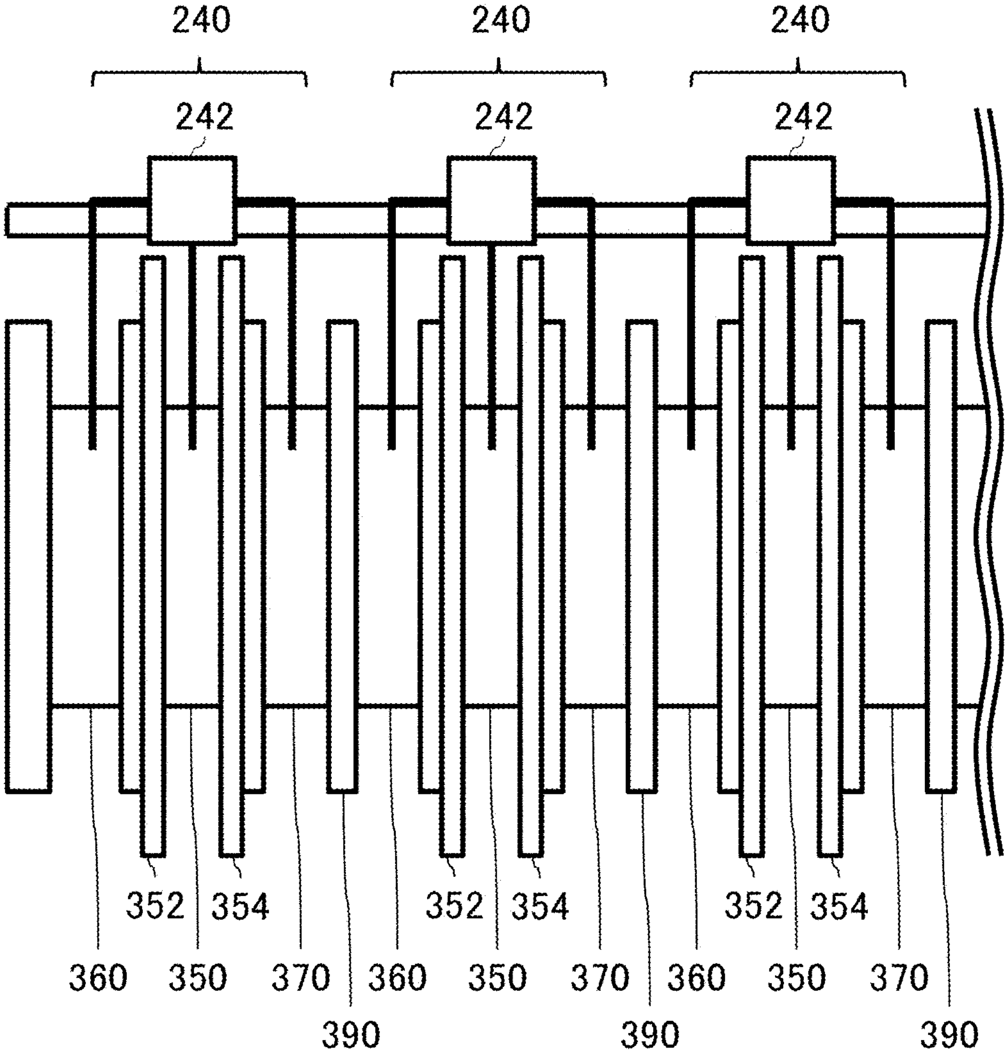
FIG. 7 schematically shows an example of the structure of the rotary connector 100.

FIG. 7 schematically shows an example of the rotary connector 100. The core wire barrier 352 and the core wire barrier 354 in the rotary connector 100 may have shapes in which the leakage radio wave, from the core wire brush 250 in contact with the core wire ring 350 between the core wire barrier 352 and the core wire barrier 354, is hindered from reaching another channel.

As an example, in the rotary connector 100 shown in FIG. 7, the core wire barrier 352 has a shape in which a diameter on a core wire ring 350 side is greater than a diameter on a GND ring 360 side; and the core wire barrier 354 has a shape in which a diameter on the core wire ring 350 side is greater than a diameter on a GND ring 370 side. In the example shown in FIG. 7, the core wire barrier 352 and the core wire barrier 354 have a wheel shape of a train. That is, each of the core wire barrier 352 and core wire barrier 354 is constituted by a portion of a disk shape having a first diameter and a portion of a disk shape having a second diameter greater than the first diameter. By increasing only the diameter on the core wire ring 350 side while maintaining the thickness of the core wire barrier 352 and the core wire barrier 354, it is possible to exhibit the effect of reducing the leakage radio wave by the core wire ring 350 while maintaining the characteristic impedance.

It should be noted that the core wire barrier 352 may be configured to have a shape in which the diameter on the GND ring 360 side is greater than the diameter on the core wire ring 350 side; and the core wire barrier 354 may be configured to have a shape in which the diameter on the GND ring 370 side is greater than the diameter on the core wire ring 350 side.

Figure 8:
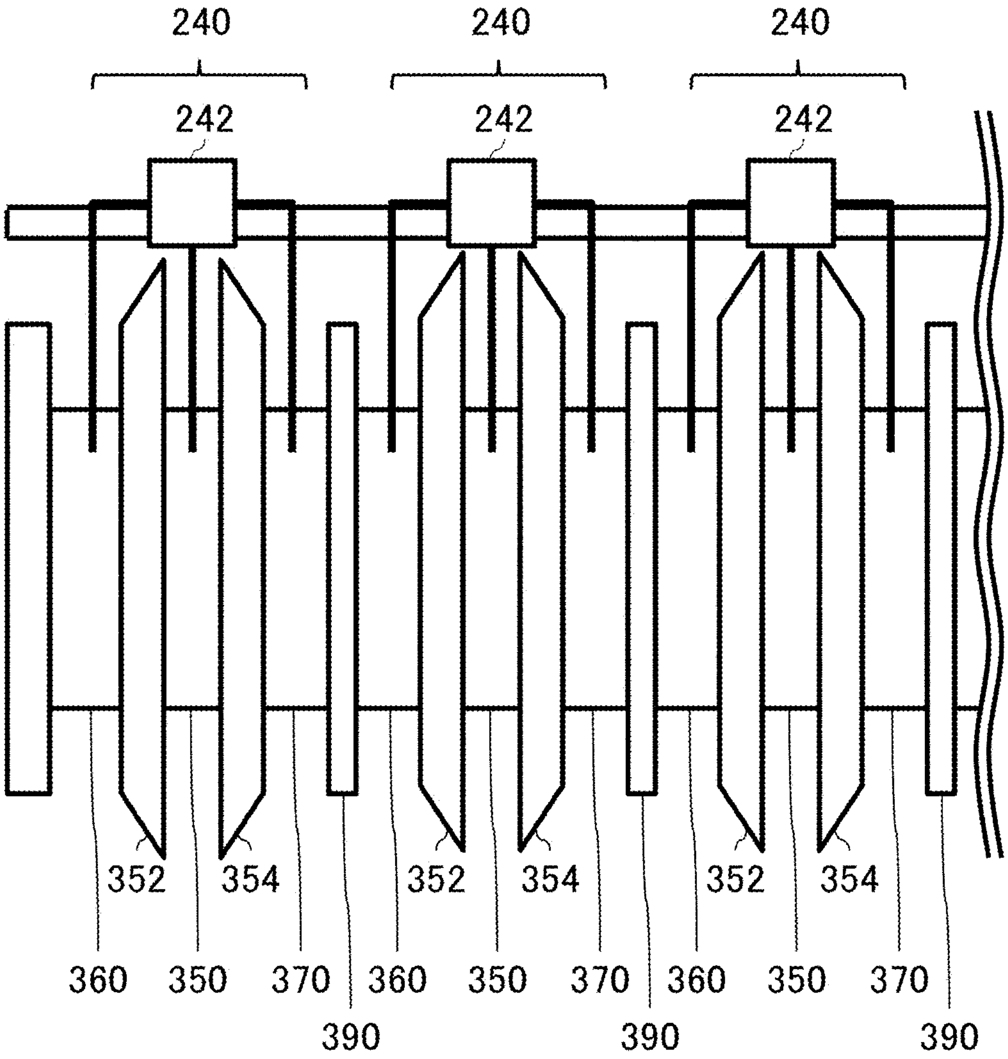
FIG. 8 schematically shows an example of the structure of the rotary connector 100.

FIG. 8 schematically shows an example of the rotary connector 100. Here, differences from FIG. 7 will be mainly described. In an example shown in FIG. 8, the core wire barrier 352 has a circular truncated cone shape in which a diameter on the core wire ring 350 side is greater than a diameter on the GND ring 360 side; and the core wire barrier 354 has a circular truncated cone shape in which a diameter on the core wire ring 350 side is greater than a diameter on the GND ring 370 side. With the shape shown in FIG. 8 as well, it is possible to exhibit the effect of reducing the leakage radio wave by the core wire ring 350 while maintaining the characteristic impedance.

Figure 9:
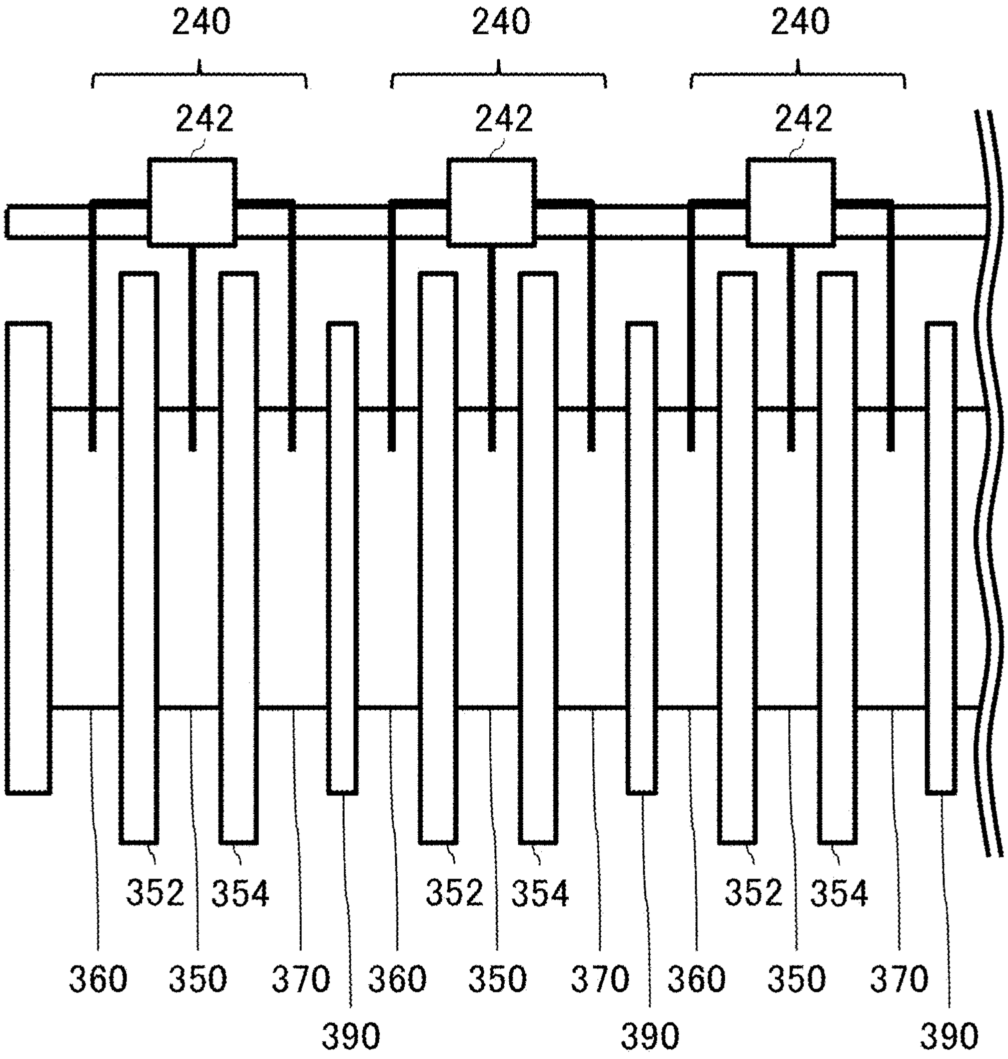
FIG. 9 schematically shows an example of the structure of the rotary connector 100.

FIG. 9 schematically shows an example of the rotary connector 100. FIG. 7 and FIG. 8 show the examples in which while the thicknesses of the core wire barrier 352 and the core wire barrier 354 are maintained, the diameter of a part is increased; however, the present invention is not limited thereto. The core wire barrier 352 and the core wire barrier 354 may be configured to have thicknesses and diameters by which the leakage radio wave of the core wire ring 350 is hindered from reaching another channel, while the characteristic impedance that is set as a target is realized. Such a thickness and such a diameter are able to be specified, for example, by checking the characteristic impedance while gradually changing the thickness and the diameter for each rotary connector 100.

Figure 10:
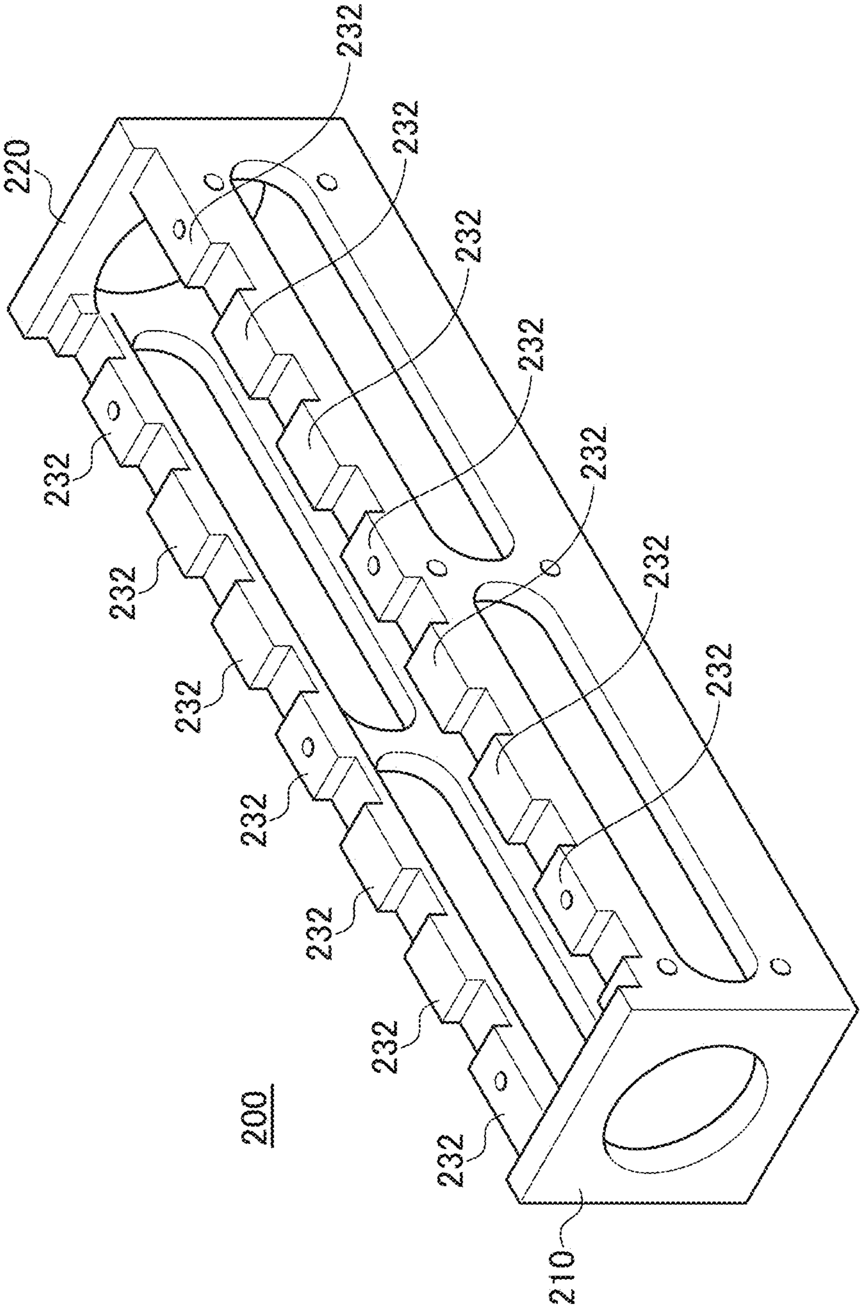
FIG. 10 schematically shows an example of a case 200.

FIG. 10 schematically shows an example of the case 200. The plurality of connector portions 240 are arranged side by side on the side surface side portion 230 of the case 200. The side surface side portion 230 of the case 200 shown in FIG. 10 includes a plurality of protrusion portions 232 which correspond to the plurality of connector portions 240, respectively. Each of the plurality of protrusion portions 232 includes at least one corner portion. FIG. 10 shows a case where the plurality of protrusion portions 232 have a rectangular parallelepiped shape.

The inventor has discovered through the experiment that by arranging the protrusion portion 232 having at least one corner portion near the core wire brush 250, the leakage radio wave of the core wire brush 250 is absorbed by the corner portion. By arranging the protrusion portion 232 at a corresponding position for each of the plurality of connector portions 240, it is possible to reduce the influence of the leakage radio wave of the core wire brush 250.

FIG. 10 shows an example of 14 protrusion portions 232 when there are 14 channels and 14 connector portions 240 are arranged in two rows in a staggered manner. The plurality of protrusion portions 232 may be arranged at positions that respectively correspond to the plurality of connector portions 240, in accordance with the number and the arrangement of the connector portions 240.

It should be noted that the protrusion portion 232 may have a plurality of corner portions on a side surface. For example, a side surface side of the protrusion portion 232 may have a jagged shape. By increasing the number of corner portions, it is possible to enhance the ability of the core wire brush 250 to absorb the leakage radio wave.

Figure 11:
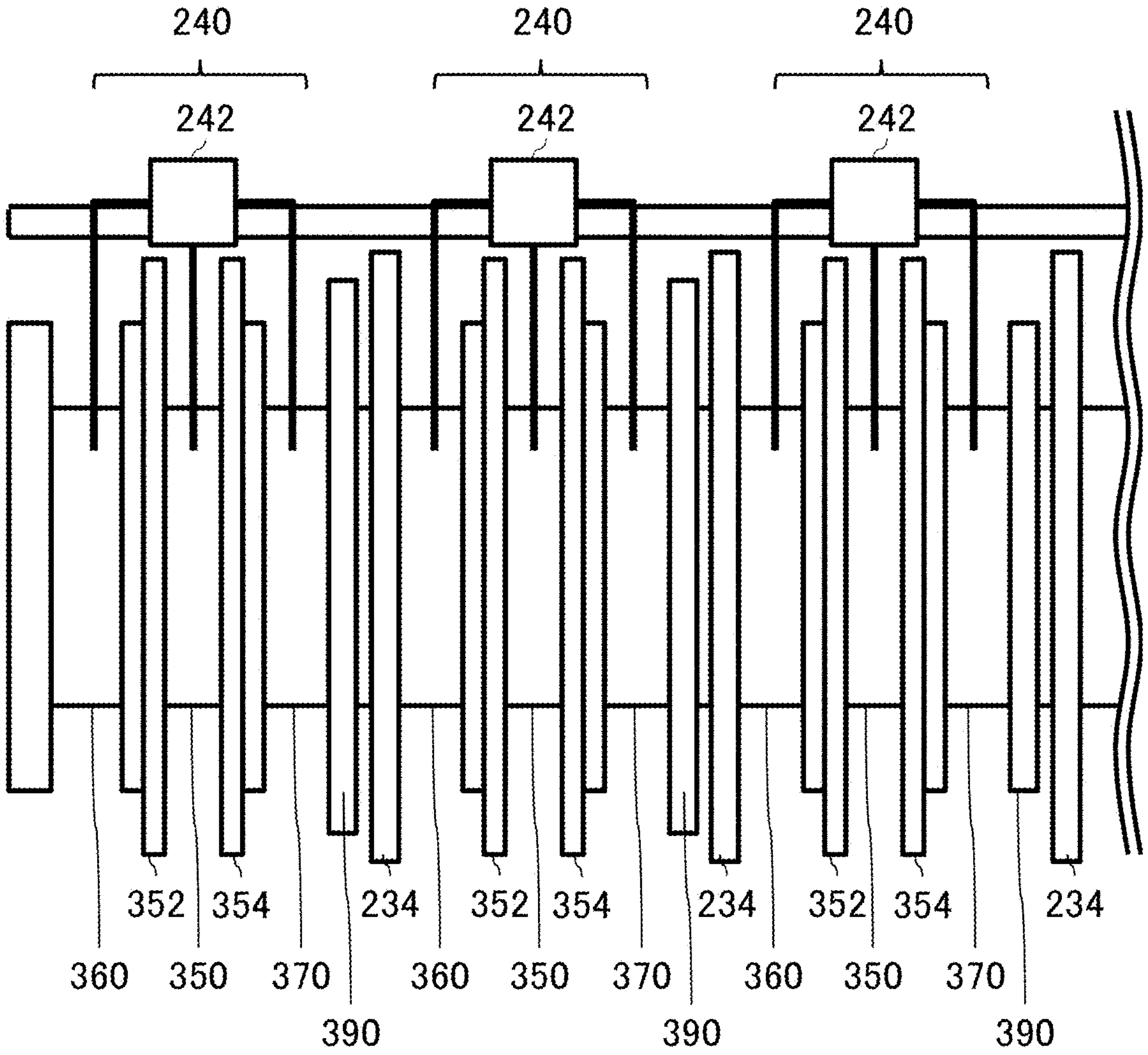
FIG. 11 schematically shows an example of the structure of the rotary connector 100.
Figure 12:
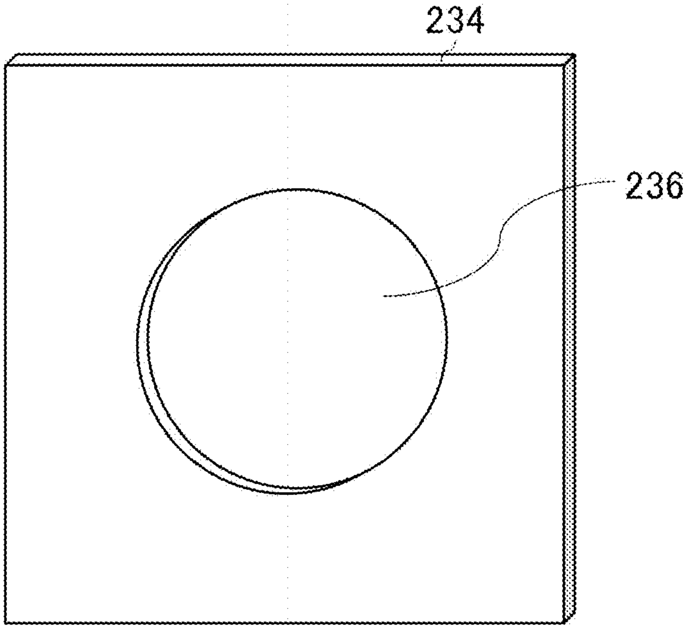
FIG. 12 shows an example of a metal partition wall portion 234.

FIG. 11 schematically shows an example of the structure of the rotary connector 100. The case 200 of the rotary connector 100 shown in FIG. 11 has a plurality of metal partition wall portions 234 which are fixed to the side surface side portion 230, and each of which separates the conductive ring portions 340 that are adjacent to each other. As shown in FIG. 12, the metal partition wall portion 234 has a hole portion 236 in which the rotor 300 is positioned. The rotor 300 rotates in the hole portion 236.

The metal partition wall portion 234 has a size for hindering the leakage radio wave, from the core wire brushes 250 in contact with the core wire rings 350 of the two conductive ring portions 340 that are adjacent to each other, from reaching each other.

The material of the upper surface side portion 210, the lower surface side portion 220, the side surface side portion 230, and the connector portion 240 may be aluminum. The material of the upper surface side portion 210, the lower surface side portion 220, the side surface side portion 230, and the connector portion 240 may be another metal such as stainless steel. The metal partition wall portion 234 may be installed in a manner of being fixed to the side surface side portion 230. The metal partition wall portion 234 may be formed integrally with the side surface side portion 230.

By the case 200 having the plurality of metal partition wall portions 234, it is possible to reduce the leakage influence of the leakage radio wave of the core wire ring 350 between the plurality of channels.

In the example shown in FIG. 11, the channel barrier 390 has a greater diameter in comparison with that of the channel barrier 390 shown in FIG. 5. In this manner, by the channel barrier 390, it is possible to hinder the leakage radio wave of the core wire ring 350 from reaching the adjacent channel.

The channel barrier 390 may be a solid GND substrate. This can make it easy to block or absorb the leakage radio wave. In addition, it is possible to reduce a weight in comparison with a case where the channel barrier 390 is constituted by a metal such as aluminum. The rotor 300 which supports the plurality of channels tends to have a long overall length; however, by setting the channel barrier 390 to be light, it is possible to prevent the rotor 300 from bending.

While the present invention has been described by way of the embodiments, the technical scope of the present invention is not limited to the above-described embodiments. It is apparent to persons skilled in the art that various alterations or improvements can be added to the above-described embodiments. It is also apparent from the scope of the claims that the embodiments added with such alterations or improvements can be included in the technical scope of the invention.

The operations, procedures, steps, and stages of each process executed by a device, system, program, and method shown in the claims, embodiments, or diagrams can be achieved in any order as long as the order is not indicated by "prior to," "before," or the like and as long as the output from a previous process is not used in a later process. Even if the process flow is described using phrases such as "first" or "next" in the claims, embodiments, or diagrams, it does not necessarily mean that the process must be executed in this order.

EXPLANATION OF REFERENCES

100: rotary connector; 200: case; 210: upper surface side portion; 220: lower surface side portion; 230: side surface side portion; 232 protrusion portion; 234 metal partition wall portion; 236 hole portion; 240: connector portion; 242 connector; 250: core wire brush; 260: GND brush; 270: GND brush; 300: rotor; 310: upper surface; 320: lower surface; 340: conductive ring portion; 350: core wire ring; 352 core wire barrier; 354 core wire barrier; 360: GND ring; 370: GND ring; 390: channel barrier.

What is claimed is:

1. A rotary connector comprising:
a case; and
a rotor of a cylindrical shape which is arranged in the case to be able to be rotated with respect to the case, wherein
the rotor has
a plurality of conductive ring portions which respectively correspond to a plurality of channels, and
a plurality of channel barriers arranged respectively between the plurality of conductive ring portions,
each of the plurality of conductive ring portions includes
a core wire ring,
a first ground (GND) ring,
a second GND ring,
a first core wire barrier arranged between the core wire ring and the first GND ring, and
a second core wire barrier arranged between the core wire ring and the second GND ring,
the case has a plurality of connector portions which respectively correspond to the plurality of channels,
each of the plurality of connector portions includes
a connector,
a core wire brush having one end side connected to the connector and another end side in contact with the core wire ring,
a first GND brush having one end side connected to the connector and another end side in contact with the first GND ring, and
a second GND brush having one end side connected to the connector and another end side in contact with the second GND ring,
the first core wire barrier and the second core wire barrier have shapes in which a leakage radio wave, from the core wire brush in contact with the core wire ring between the first core wire barrier and the second core wire barrier, is hindered from reaching another channel,
the first core wire barrier has a shape in which a diameter on a core wire brush side is greater than a diameter on a first GND ring side, and
the second core wire barrier has a shape in which a diameter on the core wire brush side is greater than a diameter on a second GND ring side.

2. The rotary connector according to claim 1, wherein
the case has
an upper surface side portion which corresponds to an upper surface of the rotor,
a lower surface side portion which corresponds to a lower surface of the rotor,
a side surface side portion which covers the rotor, and
a plurality of metal partition wall portions which are fixed to the side surface side portion, and each of which separates the conductive ring portions that are adjacent to each other, and
the plurality of metal partition wall portions include hole portions in which the rotor is positioned.

3. The rotary connector according to claim 2, wherein each of the plurality of metal partition wall portions has a size for hindering the leakage radio wave, from the core wire brushes in contact with the core wire rings of the two conductive ring portions that are adjacent to each other, from reaching each other.

4. The rotary connector according to claim 2, wherein a material of the upper surface side portion, the lower surface side portion, the side surface side portion, and the plurality of metal partition wall portions is aluminum.

* * * * *